United States Patent [19]
Sulzbach et al.

[11] Patent Number: 6,147,133
[45] Date of Patent: *Nov. 14, 2000

[54] PROCESS AND DEVICE FOR PRODUCING FOAM USING CARBON DIOXIDE DISSOLVED UNDER PRESSURE

[75] Inventors: Hans-Michael Sulzbach, Königswinter; Ferdinand Althausen, Neunkirchen-Seelscheid; Reiner Raffel, Siegburg; Robert Eiben, Lampertheim; Wilfried Ebeling, Köln, all of Germany

[73] Assignees: Hennecke GmbH; Bayer Aktiengesellschaft, both of Leverkusen, Germany

[ * ] Notice: This patent is subject to a terminal disclaimer.

[21] Appl. No.: 09/180,982

[22] PCT Filed: May 16, 1997

[86] PCT No.: PCT/EP97/02521

§ 371 Date: Nov. 19, 1998

§ 102(e) Date: Nov. 19, 1998

[87] PCT Pub. No.: WO97/45240

PCT Pub. Date: Dec. 4, 1997

[30] Foreign Application Priority Data

May 24, 1996 [DE] Germany ............ 196 20 991

[51] Int. Cl.⁷ .................................. C08G 18/04
[52] U.S. Cl. .................... 521/155; 425/4 C; 521/130; 521/137
[58] Field of Search .............. 425/4 C; 521/155, 521/130, 137

[56] References Cited

U.S. PATENT DOCUMENTS

| 3,184,419 | 5/1965 | Merriman . | |
|---|---|---|---|
| 4,500,656 | 2/1985 | Rasshofer et al. | 521/164 |
| 5,620,710 | 4/1997 | Fiorentini et al. . | |
| 5,629,027 | 5/1997 | Fiorentine et al. | 425/4 C |
| 5,639,483 | 6/1997 | Fiorentini et al. | 425/4 C |
| 5,665,287 | 9/1997 | Fiorentini et al. | 264/53 |
| 5,789,457 | 8/1998 | Eiben et al. | 521/130 |
| 5,883,143 | 3/1999 | Eiben et al. | 521/130 |

FOREIGN PATENT DOCUMENTS

| 4425317 | 1/1996 | Germany . |
| 4425319 | 1/1996 | Germany . |
| 4442254 | 5/1996 | Germany . |
| 803771 | 10/1958 | United Kingdom . |

*Primary Examiner*—John M. Cooney, Jr.
*Attorney, Agent, or Firm*—Joseph C. Gil; Noland J. Cheung; Lyndanne M. Whalen

[57] ABSTRACT

A process and a device are described for the continuous production of block foam by the foaming of a mixture which reacts to form polyurethane and which contains carbon dioxide dissolved under pressure, wherein the pressure of the reactive mixture is reduced on passing through a pressure reduction zone in the form of an aperture, and blockage of the aperture is prevented by the relative movement of the aperture-delimiting faces with respect to each other.

10 Claims, 5 Drawing Sheets

PROCESS AND DEVICE FOR PRODUCING
FOAM USING CARBON DIOXIDE
DISSOLVED UNDER PRESSURE

FIELD OF INVENTION

The present invention relates to a process and a device for the production of foams by means of carbon dioxide dissolved under pressure as a foaming agent, wherein the composition to be foamed is mixed under pressure with what is preferably liquid carbon dioxide and is subsequently depressurised with the formation of foam. Liquid starting materials for plastics, which harden to form the foamed plastic due to an addition polymerisation or condensation polymerisation reaction which sets in after foaming, are used in particular as the foamable compositions. This invention relates in particular to polyurethane foamed materials.

BACKGROUND OF INVENTION

In the production of polyurethane foamed material, at least one of the reactive components (a polyisocyanate and compounds containing hydrogen atoms which are reactive towards isocyanates, particularly polyols) is treated with a liquid or gaseous foaming agent, mixed thereafter with the another component, and the mixture obtained is introduced either batch-wise into a mould or continuously on to a conveyor belt, where the mixture foams and hardens.

A series of processes for the production of foam have found wide application in the technology. Firstly, liquids which volatilise at low temperature are used, such as low molecular weight chlorofluorocarbons, methylene chloride, pentane, etc., which volatilise from the reactive mixture whilst the latter is still liquid and form small bubbles (physical production of foam). In addition, air can be beaten into the reactive mixture or into one of the components (mechanical production of foam), and finally water is added as a foaming agent to the polyol component for polyurethane foams; after mixing with the isocyanate component, the water releases carbon dioxide as a foaming gas by reaction with the isocyanate (chemical production of foam).

For reasons of environmental compatibility and industrial hygiene, and due to the comparatively high solubility of liquid carbon dioxide in the polyol component, liquid carbon dioxide has already often been proposed as a foaming agent (GB-A-803 771, U.S. Pat. No. 3,184,419), but these prior proposals have hitherto not become part of the technology, apparently. due to the difficulties of producing uniform foams during the requisite depressurisation of the reactive mixture from pressures between 10 and 20 bar. In this connection, the problem is firstly that the carbon dioxide volatilises relatively suddenly immediately after depressurisation, so that a very considerable increase in volume occurs of the reactive mixture, by a factor of about 10 for example, which is difficult to control. Secondly, the reactive mixture tends to produce distortions in the evolution of the carbon dioxide, which may occur at 3 to 6 bar below the equilibrium vapour pressure of $CO_2$ at the temperature concerned, so that this results in sudden explosion-like evolutions of carbon dioxide, with the consequence that large bubbles or voids are included in the foamed material.

In order to produce a uniform foam structure, it is also known that finely-divided air or nitrogen bubbles can be introduced into the liquid reactive mixture; these serve as bubble seeds, so that any local supersaturation of physically dissolved or chemically produced foaming agent is prevented.

When physically dissolved carbon dioxide is used as a foaming agent, however, the problem exists that the release of carbon dioxide occurs over periods of time in which the addition polymerisation reaction scarcely progresses, so that the froth obtained after the release of the carbon dioxide is still very susceptible to stresses due to shearing forces. Shearing forces acting on the froth result in the destruction of foam bubbles, so that larger foam bubbles are formed and a non-uniform foam structure results. This is the situation in particular when the foam bubbles reach a diameter at which the shape of the bubble departs from a spherical form, i.e. when the volume of bubbles in the froth occupies a spatial proportion which is larger than that which corresponds to the closest packing of spheres. A volume of bubbles which corresponds to the closest packing of spheres is reached when 0.5 parts by weight of carbon dioxide with respect to 100 parts by weight of reactive mixture are released at atmospheric pressure.

In the continuous production of blocks of foamed material (see Becker/Braun, Kunststoffhandbuch, Volume 7, Polyurethane, 1993, FIGS. 4.8 and 4.9, page 148), the deposition of froth on the conveyor belt and its distribution over the width of the conveyor belt can be considered to be problematical for the froth.

In order to overcome the deposition and distribution problems of the froth on the conveyor belt, it has been proposed according to EP-A 645 226 that the mixture which reacts to form polyurethane and which contains carbon dioxide dissolved under pressure is firstly distributed, on the pressurised side, over the width of the conveyor belt in what is termed a pressure equalisation chamber, that the pressure is subsequently reduced in a pressure reduction zone extending over the width of the conveyor belt, which is constructed in the form of an aperture or a row of passageway holes which extend over the width of the conveyor belt and which provide a sufficient resistance to flow, and that a foaming chamber is subsequently provided which extends transversely over the conveyor belt and widens in the direction of flow, from which the froth emerges at a velocity of flow matched to the speed of the conveyor belt. The disadvantages of this proposal are that the velocity of flow of the reactive mixture is too low in the pressure equalisation chamber of large volume, coupled with the relatively long dwell time of the froth in the foaming chamber, the relatively large ratio of the foaming chamber wall to the foaming chamber cross-section, and the difficulty of preventing differences between the velocity of flow at the outlet of the foaming chamber and the speed of the conveyor belt. In particular, enlarged bubbles produced by the shearing of the froth from the lower boundary wall of the foaming chamber and at the transition from the foaming chamber to the conveyor belt can no longer disappear to the surroundings by bursting and release of the included gas to the surroundings, since they are covered by the froth. Instead, enlarged gas bubbles such as these, which are produced on the underside of the froth mass, migrate into the froth during the addition polymerisation reaction which is progressing and are included in the foam produced.

According to DE-A 44 22 568, DE-A 44 25 317 and DE-A 44 25 319, compact foaming devices have already been proposed which do not comprise either the pressure equalisation chamber with its log flow paths or a foaming chamber.

In accordance with a proposal of the Applicant, which is as yet unpublished, according to DE-A 44 42 254, a reduction in velocity is effected by deflection at an impact surface in order to reduce the velocity of flow of the mixture which reacts to form polyurethane, after its emergence from the pressure reduction zone.

A feature of the known foaming devices which is always still unsatisfactory is that the serviceable period of operation is too short. This is caused either by unavoidable particles of solids, which are carried into the reactive mixture with the raw materials from supply vessels or pipelines, or by detached, caked deposits of polyurethane from the mixing chamber or from the feed to the foaming device, etc., which can block the narrow cross-section of the pressure reduction zone. This problem occurs to an increased extent if the reactive mixture contains finely-divided solids, e.g. colouring pigments, melamine or recycled powder, even if the particle size of the solids is considerably less than the dimensions of the pressure reduction zone.

SUMMARY OF THE INVENTION

The present invention relates to a process for the continuous production of block foam by the foaming of a polyurethane mixture which contains carbon dioxide dissolved under pressure, wherein the pressure of the reactive mixture is reduced on passing through a pressure reduction zone in the form of an aperture, which is characterised in that the pressure reduction zone is constructed in the form of one or more coaxial, annular apertures and the velocity of the reactive mixture after passing through the annular aperture or apertures is reduced in one or more coaxial velocity reduction zones in the form of annular apertures.

DETAILED DESCRIPTION OF THE INVENTION

The aperture-delimiting faces which form the pressure reduction zone are preferably moved at least temporarily in relation to each other.

Due to the relative movement of the two aperture-delimiting faces of an aperture, any solid particles which may possibly be stuck in the aperture are conveyed through the aperture by the simultaneous action of the reactive mixture flowing through the aperture at high velocity, so that a blockage is prevented.

The relative movement of the aperture-delimiting faces can be effected periodically at high frequency, e.g. by transmitting an ultrasonic vibration to at least one of the aperture-delimiting faces.

The relative movement may also be effected so that the aperture is transiently opened further or is transiently narrowed.

If the pressure reduction zone is constructed in the form of one or more concentric annular apertures, the relative movement of the aperture-delimiting faces can be effected by a rotating movement of one aperture-delimiting face in relation to the other.

The movement of the aperture-delimiting faces in relation to each other may be effected continuously, periodically or intermittently.

In the case of rotationally symmetrical apertures, the aperture-delimiting faces are preferably moved continuously in relation to each other at a speed of rotation of 1 to 60 rpm, most preferably 1 to 10 rpm.

In the case of movement by ultrasonic excitation, an intermittent movement is preferred.

According to another preferred embodiment of the present invention, the aperture width is of adjustable construction. A pressure measuring sensor is preferably provided at the outlet of the mixing chamber, at the connecting pipe between the mixing chamber and the foaming device or in the distribution chamber of the foaming device, which pressure measuring sensor acts on the adjusting device for the aperture width so that the pressure of the mixture which reacts to form polyurethane can be held constant, by regulating the aperture width, before the reactive mixture passes through the pressure reduction zone, i.e. through the aperture.

According to one preferred embodiment of the invention, the direction of flow of the reactive mixture after its emergence from the pressure reduction zone is deflected by an angle of at least 90°, preferably between 90° and 150°, wherein the flow cross-section after deflection is 5 to 30 times, most preferably 10 to 20 times, larger than the flow cross-section of the pressure reduction zone. This velocity reduction zone which adjoins the pressure reduction zone is also of course constructed in the form of an aperture. Its extent in the direction of flow should be designed so that the release of carbon dioxide does still substantially not occur in this velocity reduction zone, due to the relaxation time for the release of carbon dioxide.

The extent of the pressure reduction zone in the direction of flow, i.e. the aperture length, may be 1 to 20 mm, particularly 2 to 10 mm, most preferably 3 to 8 mm. The aperture width of the pressure reduction zone, i.e. the distance between the aperture-delimiting faces, may be between 0.1 and 0.5 mm, depending on the viscosity of the mixture which reacts to form polyurethane and on the feed rate thereof. Aperture widths of 0.2 to 0.5 mm are preferred when a mixture which reacts to form polyurethane is used which contains fillers.

The linear velocity of flow of the reactive mixture through the pressure reduction zone depends on the extent of the pressure reduction zone in the direction of flow, on the aperture width, on the viscosity of the reactive mixture and on the prevailing pressure in the pressure distribution chamber, which must be higher than the saturation vapour pressure of the dissolved carbon dioxide. Typical linear velocities of flow may be between 10 and 25 m/sec. For the foaming of reactive mixtures with a high carbon dioxide content, e.g. in the range between 3 and 6% by weight carbon dioxide, high linear velocities of flow through the pressure reduction zone are preferred, e.g. between 15 and 25 m/sec, so that short dwell times are obtained in the foaming device.

The mixture which reacts to form polyurethane and which is fed to the foaming device according to the invention is produced as follows:

Aliphatic, cycloaliphatic, araliphatic, aromatic and heterocyclic polyisocyanates, such as those described by W. Siefken in Justus Liebigs Annalen der Chemie, 562, pages 75 to 136, for example, are preferably used as the isocyanate component.

Aromatic polyisocyanates are preferably used; those which are particularly preferred are generally the polyisocyanates which are readily accessible commercially, e.g. toluene 2,4- and 2,6-diisocyanate as well as any mixtures of these isomers ("TDI"), polyphenyl-polymethylene polyisocyanates such as those which are produced by aniline-formaldehyde condensation and subsequent phosgenation ("crude MDI"), and polyisocyanates containing carbodiimide groups, urethane groups, allophanate groups, isocyanurate groups, urea groups or biuret groups ("modified polyisocyanates"), particularly those modified polyisocyanates which are derived from toluene 2,4- and/or 2,6-diisocyanate.

Compounds which contain at least two hydrogen atoms capable of reacting with isocyanates, and which have molecular weights which are generally between 60 and 5000, preferably between 100 and 2000, most preferably between 200 and 800, are used as the second component ("polyol component"). In addition to compounds which contain amino groups, thiol groups or carboxyl groups, compounds such as these should preferably be understood to comprise compounds which contain hydroxyl groups, particularly compounds which contain 2 to 8 hydroxyl groups, especially those which have molecular weights between 200 and 2000, preferably 300 to 1200, e.g. polyesters, polyethers, polythioethers, polyacetals, polycarbonates and polyester amides which contain at least 2, generally 2 to 8, preferably 2 to 6, hydroxyl groups, such as those which are known in the art for the production of polyurethane foams; polyether polyols are quite particularly preferred.

Compounds which are suitable for use as the polyol component are described on pages 6 to 9 of EP-B 121 850.

In addition, water, other foaming agents, foam stabilisers, catalysts, fillers, colouring pigments, melamine powders and recycled plastics powders, as well as other auxiliary materials and additives known in the art, may optionally be used for the production of the reactive mixture. These media which are known in the art and which can also be used are disclosed on pages 9 to 11 of EP-B 121 850.

Water is most preferably used in conjunction as an additional foaming agent according to the invention, preferably in an amount of 1 to 7% by weight with respect to the reactive mixture. Water is most preferably used in conjunction in an amount of 2 to 5% by weight.

The media which may additionally be used may be fed separately to the mixer unit for mixing the isocyanate component and the polyol component, or may even be fed to one of the two main components before mixing the isocyanate with the polyol, wherein the water which is used in conjunction, and other additional components which possibly react with isocyanate, may only be admixed with the polyol component.

The process technology for producing polyurethane foams is illustrated in principle in Becker/Braun, Kunststoff-Handbuch, Volume 7: Polyurethanes, 1993, pages 143 to 149, especially in FIG. 4.8 and FIG. 4.9 on page 148.

The components are preferably mixed in what is termed a low-pressure agitator mixing chamber, wherein according to the invention a pressure prevails in the mixing chamber which is higher than the saturation vapour pressure of the dissolved carbon dioxide.

Carbon dioxide is dissolved in one or more of the components, particularly in the polyol component, before the components are introduced into the mixer head.

Carbon dioxide is preferably dissolved in an amount of 1 to 7% by weight, most preferably 2 to 5% by weight, with respect to the total reactive mixture.

In addition, air and/or nitrogen may be dispersed or dissolved in one of the components in order to assist the formation of bubble seeds.

Dissolution of the carbon dioxide, preferably in the polyol component only, may be effected in any desired manner, e.g.

a) gaseous carbon dioxide is mixed into the polyol by means of an agitator in a vessel which contains the polyol and which is maintained at a pressure of 15 to 25 bar;

b) liquid carbon dioxide is mixed with the polyol at room temperature, e.g. in a static mixer at a pressure of 70 to 80 bar, and is subsequently depressurised to a pressure of 15 to 25 bar before it is introduced into the low-pressure agitator mixer head;

c) liquid carbon dioxide, which is cooled to −20° C., for example, is mixed with the polyol component, which is at room temperature, at a pressure of 15 to 25 bar, wherein mixing is effected by dissolving the carbon dioxide in the polyol component before it can volatilise.

It has been found that the preferred alternative c) can be effected particularly successfully, due to the pronounced tendency of carbon dioxide to go into solution, by means of a high-speed flow stirrer which is disposed in the polyol line at the point of introduction of the liquid carbon dioxide.

The components of the reactive synthetic material, at least one of which contains the dissolved carbon dioxide, are then fed to the mixer head, are mixed there, and after their emergence from the mixer head are fed into the foaming device according to the invention.

BRIEF DESCRIPTION OF THE DRAWINGS

The invention is explained in more detail below with reference to FIGS. 1 to 11.

Figure 1:
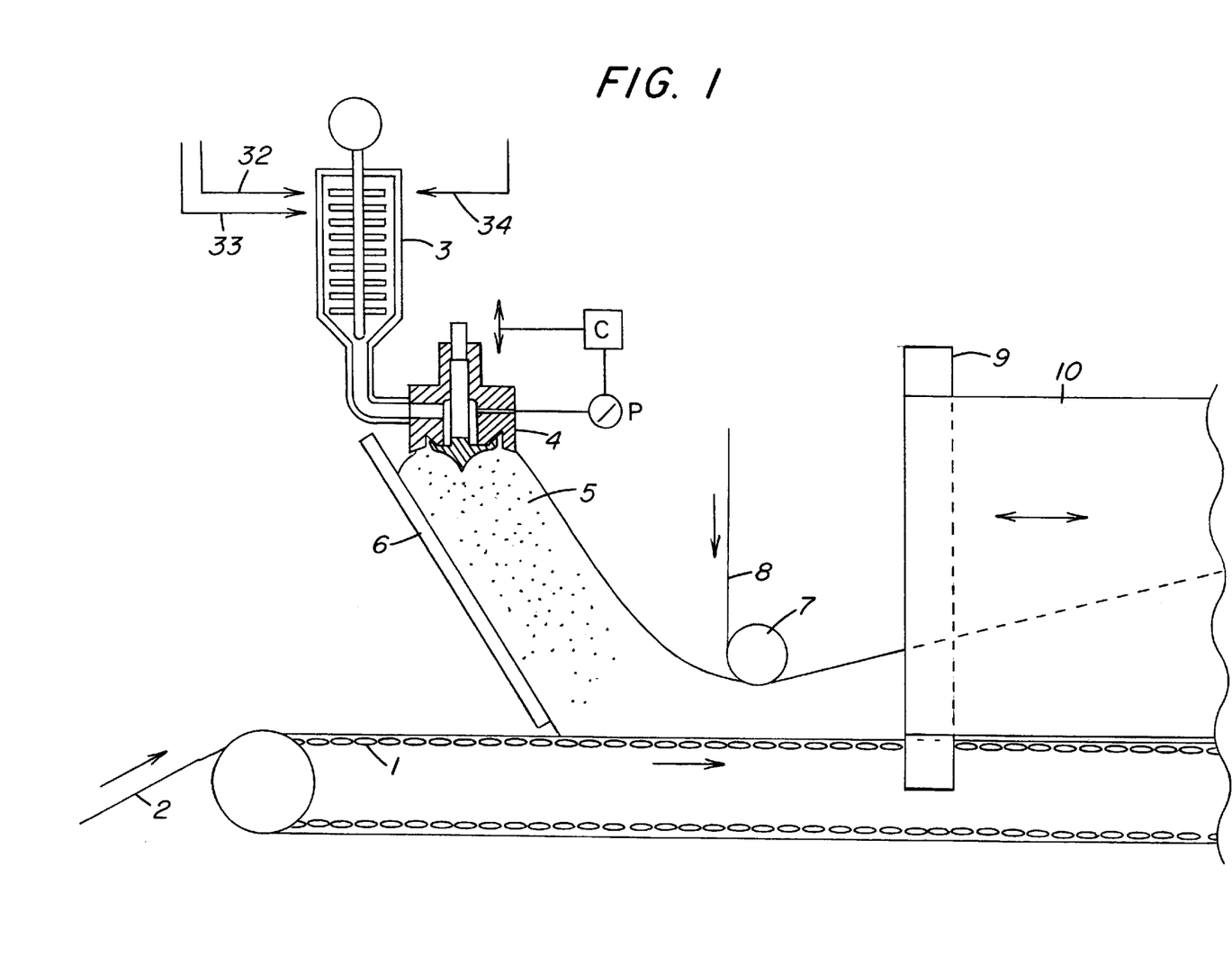
FIG. 1 is a general aspect, shown as a schematic side view, of an apparatus for carrying out the process according to the invention.

FIG. 1 is a side view of the conveyor belt 1 of a block foam installation. A lower laminating film 2 is fed to the conveyor belt 1, and is moved to the right by the conveyor belt at a speed of 3 to 7 m/min. Isocyanate 31 and polyol 32, which may contain 3 to 7% by weight of dissolved carbon dioxide, are fed under pressure to the mixer unit 3. Other additives an auxiliary materials 33 are also fed to the mixer unit. A pressure which is above the solution vapour pressure of the dissolved carbon dioxide prevails in the mixer unit. The reaction mixture is fed from the mixer unit 3 to the foam production device 4. The partially foamed reaction mixture, which is supersaturated with carbon dioxide, emerges from the foaming device 4 and flows freely on to the conveyor belt 1 as a froth. The froth pile 5 which is formed below the circularly symmetrical foaming device 4 firstly distributes itself in free flow over the width of the conveyor belt, wherein to prevent flow in the direction opposite to the direction of movement of the conveyor belt a substantially perpendicular barrier 6 is provided which extends transversely over the conveyor belt. The upper laminating film 8 is fed in the direction of movement of the conveyor belt at a distance from the feed point of the froth 5 by a deflection roller 7 which dips into the froth. In addition, lateral laminating films 10 are fed via deflection rollers 9 on both sides of the conveyor belt.

Figure 2:
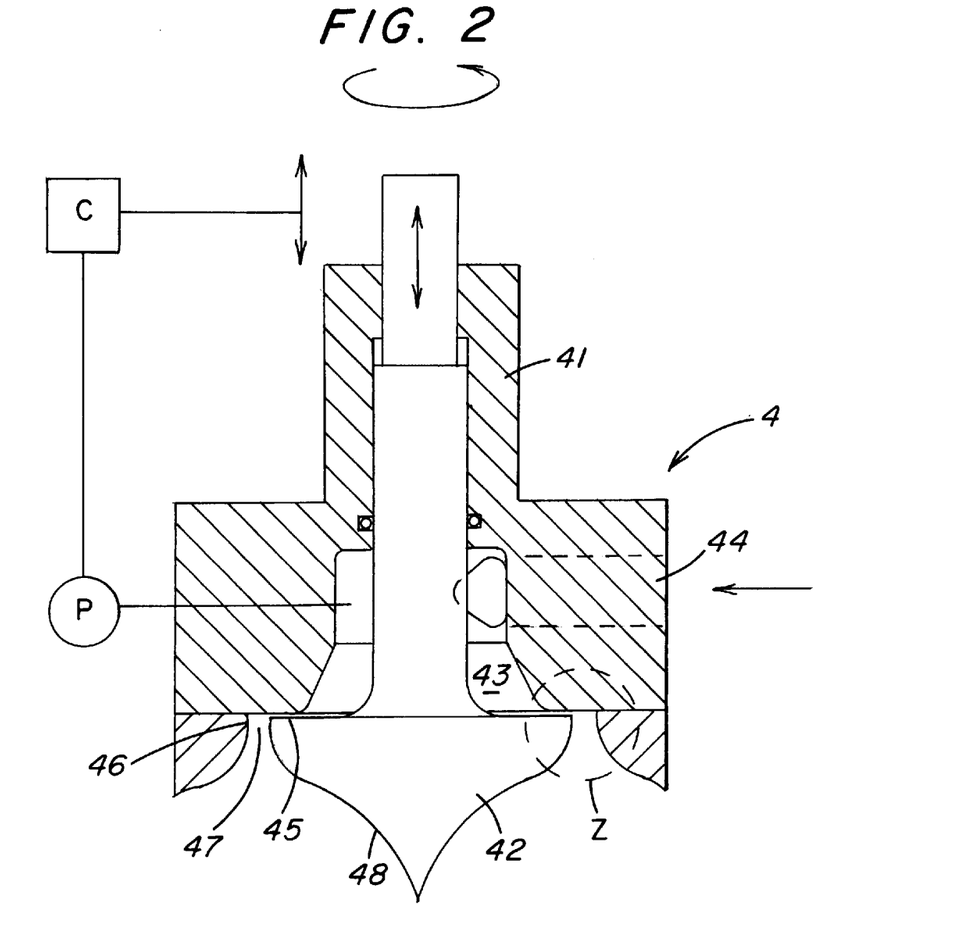
FIG. 2 shows a first embodiment of the foaming device according to the invention.

The foaming device 4 according to the invention which is shown in FIG. 2 consists of a rotationally symmetrical housing 41 and a rotationally symmetrical, central body 42, the two of which enclose a mixture distribution chamber 43, wherein the mixture which reacts to form polyurethane is fed to the mixture distribution chamber via a tangential bore 44. The housing 41 and the central body 42 also form the aperture 45 which constitutes the pressure reduction zone, through which the mixture is pushed at high velocity due to the prevailing pressure. The stream of mixture, which widens outwards with rotational symmetry, impinges on the impact surface 46, whereupon the velocity is reduced in a turbulent manner in the velocity reduction zone 47, corresponding to the cross-section of the latter which is larger than that of the aperture 45. The reactive mixture subsequently foams, with the release of the dissolved carbon dioxide, whereupon the space below the foaming device is filled along the contour 48 of the central body 42 and moreover in free flow. The central body 42 has a rotary drive, so that the aperture-delimiting face which is provided by the central body can be moved in relation to the aperture-delimiting face provided by the housing, and any particles which are deposited in the aperture can be expelled through the aperture. Provision is also made for the central body 42 to be axially displaceable, so that the width of the aperture 45 is adjustable. This can be effected by measuring the departure from the predetermined pressure in the distribution chamber 43 by means of a pressure measuring device P and controlling the drive for the axial displacement of the central body via a control unit C.

Figure 3:
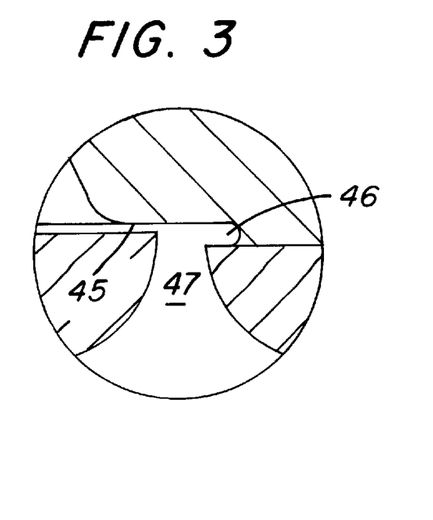
FIGS. 3 and 4 show alternative embodiments of detail Z from FIG. 2.

The enlarged detail Z from FIG. 2 which is shown in FIG. 3 illustrates the construction of the impact surface 46 for introducing the turbulent reduction in velocity, in the form of a rotationally symmetrical recess in the velocity reduction zone 47.

Figure 4:
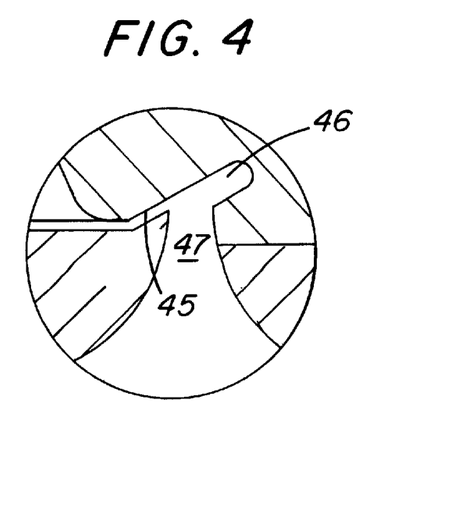

The enlarged detail Z from FIG. 2 which is shown in FIG. 4 illustrates an embodiment in which the reduction in velocity in the velocity reduction zone 47 is effected by means of a deflection by 135°.

As shown in FIG. 2, the foaming mixture which reacts to form polyurethane slides along the contour 48 of the central body 42, whereupon the space below the velocity reduction zone 47, which is in the form of an annular aperture, is filled. In this connection there is a risk, particularly with foaming devices of larger dimensions, i.e. those designed for higher throughputs of the mixture which reacts to form polyurethane, of foam bubbles which are already present being destroyed as the mixture slides off the contour 48, due to which larger voids occasionally occur, which (FIG. 1) can no longer migrate to the surface from the mass of foam 5 deposited on the conveyor belt 1. To prevent the inclusion of enlarged foam bubbles such as these, provision can be made according to the invention for the liquid foam (froth) which is first produced in the form of a rotationally symmetrical stream to be split up along a plane which extends radially in the direction of flow.

Figure 5:
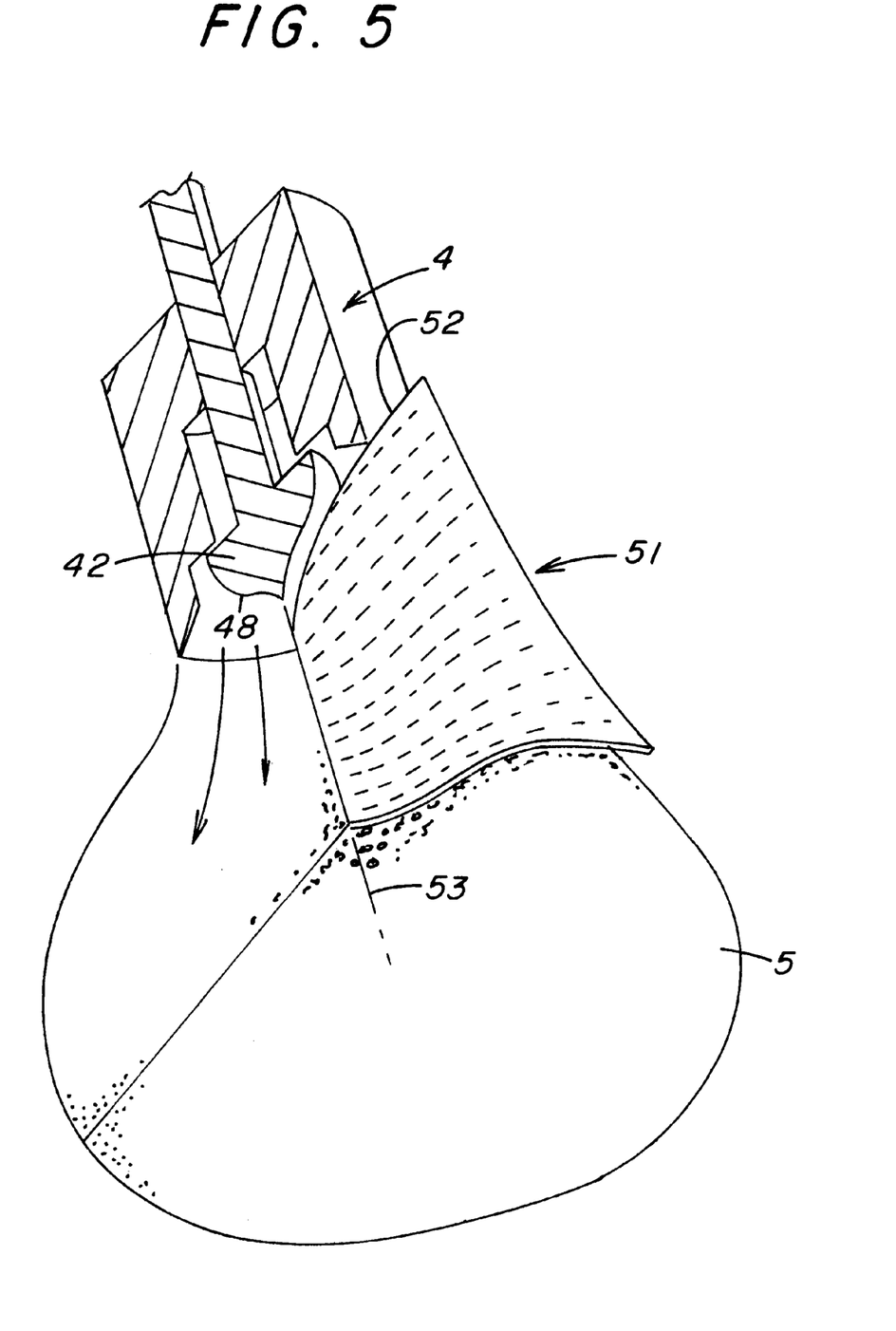
FIG. 5 shows an advantageous addition to a rotationally symmetrical foaming device;.

FIG. 5 is a perspective half-section through a foaming device 4 according to the invention, together with the froth stream 5 and a froth splitting device 51. The edge 52 of the splitting device 51 which faces the foaming device 4 cuts open the froth substantially radially, and thereafter has a contour which is indicated by the dashed lines. After the stream of foam 5 has been split up on its axis 53 in this manner, larger foam bubbles which have formed along the contour 48 of the central body 42 can escape at the surface.

Figure 6:
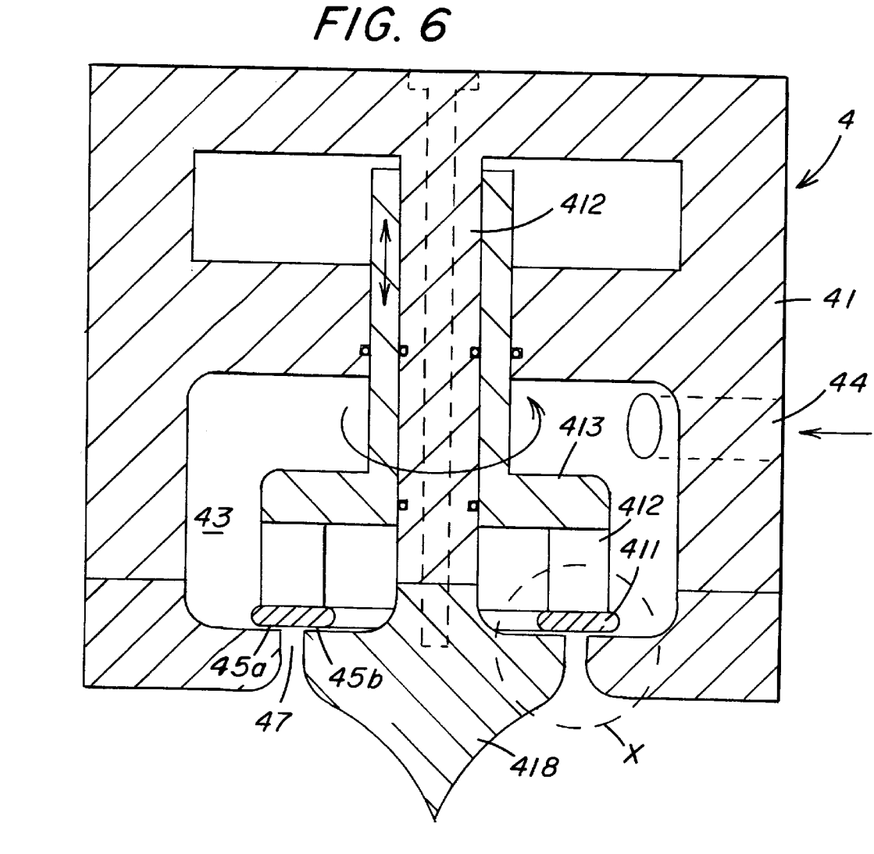
FIG. 6 shows a foaming device having concentric annular apertures.
Figure 7:
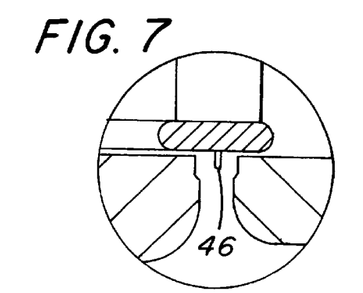
FIGS. 7, 8 and 9 show alternative embodiments of detail X (pressure reduction zone) from FIG. 6.

The foam device according to the invention which is shown in FIG. 6 has two concentric pressure reduction zones in the form of annular apertures 45*a* and 45*b*. The central body 418 is fixedly attached to the housing 41 of the foaming device 4. One delimiting face of the annular apertures 45*a* and 45*b* is formed by a disc 411, which is fixed to the bushing 413 via 3 to 6 supports 412. The bushing 413 is led out of the distribution chamber 43 so that it can rotate about the axis 417 of the central body 418. As for the remainder of the construction, identical reference numerals denote elements which are identical to those in FIG. 2. The deflection of the streams of reactive mixture emerging from the annular apertures 45*a* and 45*b* is effected so that their velocity is reduced in the common velocity reduction zone as they impinge upon each other. As an alternative, detail X from FIG. 6 which is shown in FIG. 7 illustrates a rib 46 which takes over the function of the impact surface.

Figure 8:
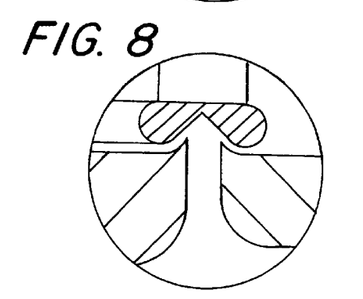

The alternative embodiment of detail X from FIG. 6 which is shown in FIG. 8 illustrates a 135° deflection following the pressure reduction zone.

Figure 9:
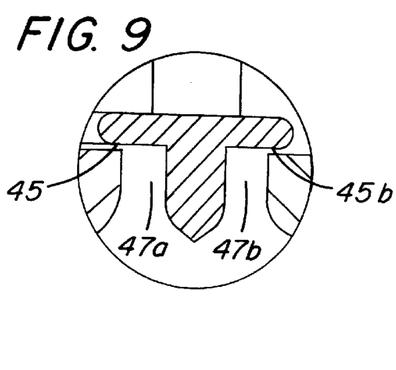
Figure 10:
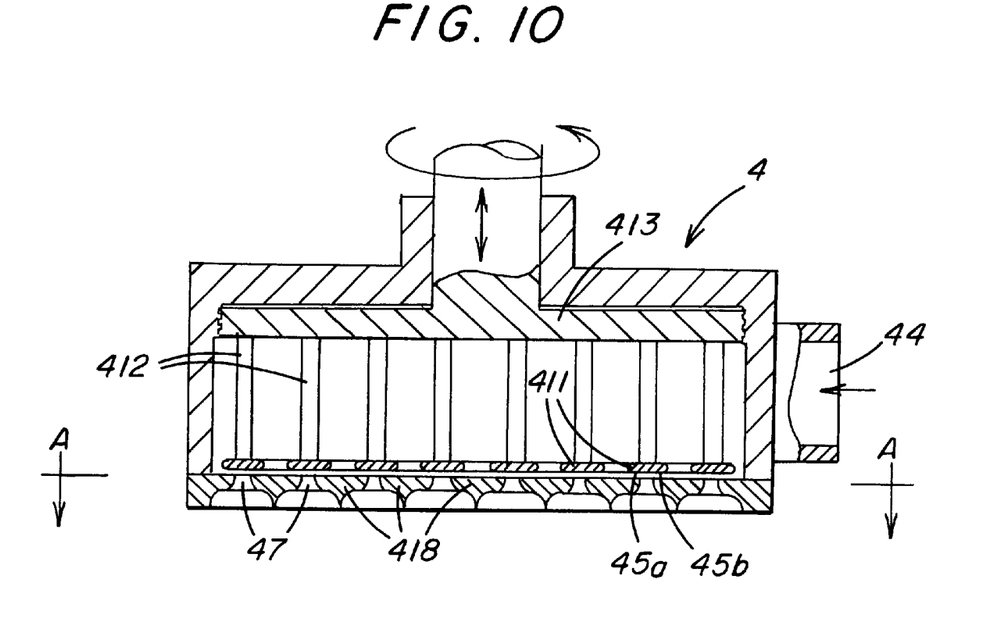
FIGS. 10 and 11 show a foaming device according to the invention having a plurality of parallel apertures.
Figure 11:
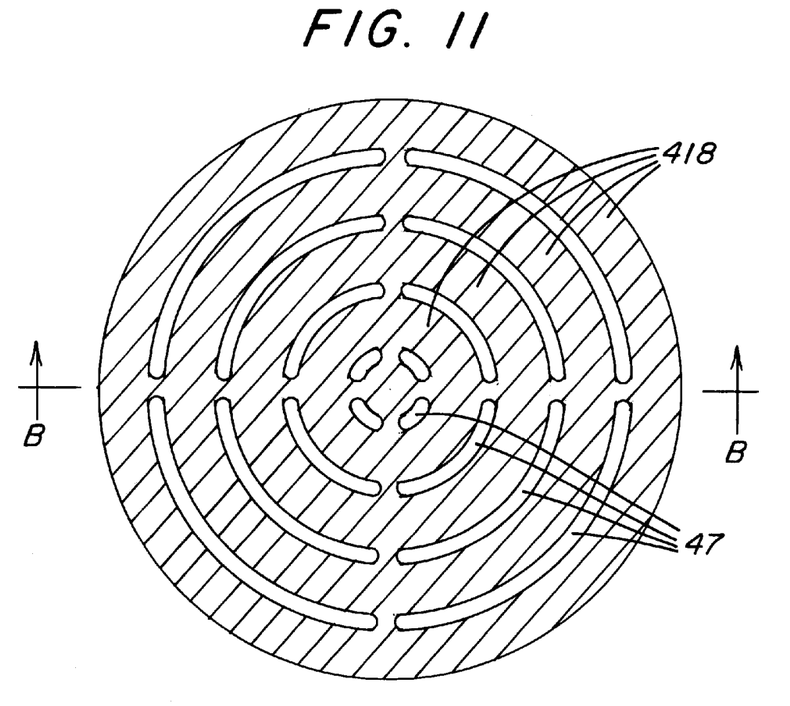

According to the alternative embodiment of detail X from FIG. 6 which is shown in FIG. 9, separate velocity reduction zones 47*a* and 47*b* are provided. FIGS. 10 and 11 show a foaming device according to the invention which has a multiplicity of concentric pressure reduction zones 45 and corresponding velocity reduction zones 47. FIG. 10 constitutes a section B—B through the illustration according to FIG. 11. FIG. 11 constitutes a section A—A through the illustration according to FIG. 10. In FIGS. 10 and 11, functional elements which are comparable with those of FIG. 6 are denoted by identical reference numerals. The relative movement of the delimiting faces of the pressure reduction zone 45 can, for example, be produced (optionally additionally) by an ultrasonic crystal 49 mounted on the housing 41 of the device.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous production of block foam comprising the step of foaming a mixture which reacts to form polyurethane and which contains carbon dioxide dissolved under pressure, wherein the pressure of the reactive mixture is reduced on passing said reactive mixture through a pressure reduction zone in the form of an aperture, whereby said pressure reduction zone comprises at least one coaxial, annular aperture; and the velocity of said reactive mixture after passing through said at least one coaxial, annular aperture is reduced in at least one coaxial velocity reduction zone in the form of annular apertures.

2. A process according to claim 1, whereby the direction of flow of the reactive mixture in the pressure reduction zone forms an angle of 90 to 150° with the direction of flow in the velocity reduction zone.

3. A process according to claim 1, whereby the direction of flow in the velocity reduction zone runs substantially parallel to the axis of the annular aperture.

4. A process according to claim 1, whereby the aperture-delimiting faces of the pressure reduction zone are moved at least temporarily in relation to each other.

5. A process according to claim 4, whereby the aperture-delimiting faces are rotated in relation to each other.

6. A process according to claim 4, whereby the movement of the aperture-delimiting faces in relation to each other is produced by ultrasonics.

7. A process according to claim 4, whereby the aperture width of the pressure reduction zone is transiently narrowed and/or widened.

8. A device for the continuous production of block foam by foaming a reactive mixture which reacts to form polyurethane and which contains carbon dioxide dissolved under pressure, containing a rotationally symmetrical pressure distribution chamber having at least one coaxial outlet aperture, wherein the direction of passage of said reactive mixture through said at least one outlet aperture forms an angle of 90 to 150° with the axis of said pressure distribution chamber, wherein said pressure distribution chamber comprises at least one of the aperture-delimiting faces comprising a rotationally symmetrical, coaxial, central body which is located within said pressure distribution chamber, and wherein in addition, following said outlet aperture, an axially parallel annular aperture is provided which has a cross section of 8 to 20 times larger than that of said outlet aperture.

9. A device according to claim 8, wherein means are provided for moving the central body axially.

10. A device according to claim 8, wherein means are provided for the rotation of the central body.

* * * * *